United States Patent
Kim

(10) Patent No.: US 7,756,395 B2
(45) Date of Patent: Jul. 13, 2010

(54) VIDEO RECORDING AND REPRODUCING APPARATUS AND METHOD THEREOF

(75) Inventor: Dong-ik Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1500 days.

(21) Appl. No.: 10/967,186

(22) Filed: Oct. 19, 2004

(65) Prior Publication Data

US 2005/0281537 A1 Dec. 22, 2005

(30) Foreign Application Priority Data

Jun. 18, 2004 (KR) .................. 10-2004-0045301

(51) Int. Cl.
*H04N 5/91* (2006.01)
(52) U.S. Cl. .......................... 386/83; 386/94
(58) Field of Classification Search .................. 386/46, 386/83, 95, 125
See application file for complete search history.

(56) References Cited

U.S. PATENT DOCUMENTS

| 5,543,933 A * | 8/1996 | Kang et al. ............... 386/83 |
| 5,734,444 A * | 3/1998 | Yoshinobu ............... 725/14 |
| 2008/0184297 A1* | 7/2008 | Ellis et al. ............... 725/39 |

FOREIGN PATENT DOCUMENTS

| JP | 06295484 A | * 10/1994 |
| KR | 1994-0036612 | 12/1994 |
| KR | 1994-0036636 | 12/1994 |
| KR | 1994-0039617 | 12/1994 |
| KR | 1996-068255 | 12/1996 |

* cited by examiner

*Primary Examiner*—Huy T Nguyen
(74) *Attorney, Agent, or Firm*—Staas & Halsey LLP

(57) ABSTRACT

An apparatus and method to store a recording pattern of a user. Recording information and recording pattern including the record repetition count are stored to record the user's favorite programs and a message is displayed to notify the user of the recording start time of the favorite programs.

24 Claims, 4 Drawing Sheets

| RECORDING PATTERN NO. | RECORD DATE | RECORD START TIME | RECORD BROADCAST CHANNEL | RECORD REPETITION COUNT |
|---|---|---|---|---|
| 1 | FRIDAY | 9:00 pm | 24 | 12 |
| 2 | THURSDAY | 9:00 pm | 24 | 11 |
| 3 | WEDNESDAY | 10:30 pm | 12 | 4 |
| ⋮ | ⋮ | ⋮ | ⋮ | ⋮ |
| 12 | | | | |

VIDEO RECORDING AND REPRODUCING APPARATUS AND METHOD THEREOF

CROSS-REFERENCE TO RELATED APPLICATION

This application claims the benefit of Korean Patent Application No. 2004-45301 filed on Jun. 18, 2004 in the Korean Intellectual Property Office, the disclosure of which is incorporated herein by reference in its entirety.

BACKGROUND OF THE INVENTION

1. Field of the Invention

The present invention generally concerns a video recording and reproducing apparatus and a method to control a video and reproducing apparatus. More concretely, the present invention concerns a video recording apparatus capable of storing a recording pattern of a user and a method to control a video recording apparatus capable of storing a recording pattern of a user.

2. Description of the Related Art

In conventional video recording and/or reproducing apparatuses, the video recording and reproducing apparatus records a broadcast signal onto a recording medium and/or reproduces the recorded broadcast signal. Such a video recording and reproducing apparatus has more expanded operations with the development of digitization and compression of the broadcast signal. Furthermore, video recording and reproducing apparatuses to support various video sources such as satellite broadcasts, cable broadcasts, and network broadcasts through the Internet, and to enter upon a phase of recording data, such as a compact disc-read only memory (CD-ROM) title or a digital versatile disc (DVD) title, on an optical medium, or, a phase of reproducing the recorded data from the recording medium are being developed with advances of the digitization and the data compression technologies.

The optical recording medium, for example, the DVD storing video and audio data, generally may store hundreds of megabytes to tens of gigabytes. Hence, the optical recording medium conventionally adopts a hard disc drive (HDD) of a large storage capacity so as to facilely record or read massive data. A representative of the video recording and reproducing apparatus is a DVD/HDD video recording and reproducing apparatus. The DVD/HDD video recording and reproducing apparatus is constructed by combining a DVD-ROM which reproduces data recorded on a disc and an HDD which records and reproduces data within a single casing. The DVD-ROM and the HDD independently operate and respectively have an interface to transfer and receive data with each other. The DVD-ROM generally reproduces data recorded on the optical recording medium such as DVD, audio CD, video CD, and MP3 (MPEG-1 Audio Layer-3) CD.

The DVD/HDD recording and reproducing apparatus may receive the broadcast signal from the outside, and record the received data on the HDD or transmit the received data to the outside, and may record on the HDD the data reproduced from the DVD-ROM. When recording on the HDD the reproduced data of the DVD-ROM or the external signal, the user may store a plurality of programs on the HDD having a large storage capacity.

Hereinbelow, the DVD/HDD video recording and reproducing apparatus is described in greater detail with reference to FIG. 1.

FIG. 1 illustrates a schematic block diagram of a DVD/HDD combo system combining a DVD player and a HDD. As shown, a DVD reproducing device FIG. includes a switch 10, a MPEG encoding part 20, a HDD 30, a flash ROM 40, a controller 50, a random access memory (RAM) 60, a signal receiver 70, a digital signal processor 80, a display 85, and a DVD player 90.

The switch 10 receives diverse video and audio data sources and particular channels from the outside, and/or, outputs the video data source output from the digital signal processor 80 to the external display 85. The switch 10 receives a broadcast signal and an external signal, such as a component signal and a composite signal applied from a video tape recorder (not shown), and selectively feeds the received signals to the operation block of FIG. 1. For example, if the external signal received from an external device such as the video tape is the component or composite signal, the switch 10 transfers the received signal to the MPEG encoding part 20. The switch 10 is constructed to operate in a picture-in-picture (PIP) block 11 according to the PIP mode operation of the controller 50.

The MPEG encoding part 20 includes a video decoder 21, an audio analog-to-digital converter (ADC) 22, and a MPEG encoder 23. The MPEG encoding part 20 converts analog data of the video data source received from the switch 10 to digital data, and compresses the converted data using MPEG standards (for example, MPEG-2). In general, the compression of the MPEG video data reduces data size for storing on the storage medium such as the HDD 30.

The HDD 30 is constructed to store or read the MPEG video data and audio data on or from data storage space as a file format.

The flash ROM 40 contains operating system (OS) and applications to manage the DVD reproducing device. The flash ROM 40 also contains applications to display onto the display 85 through a Graphic User Interface (GUI) a menu of the video and audio data stored on the HDD 30 as the file format and additional information related to the stored data, such as timer-recording, icon, title, record time, and file size. Additionally, the flash ROM 40 contains applications to edit and display the video and audio data stored on the HDD 30 through the displayed menu. Especially, the GUI of the menu screen is provided, as shown in FIG. 2, to display the timer-recording screen and to assist in timer-recording a particular broadcast program. It is assumed that the flash ROM 40 described in this description designates a rewritable memory as compared with a general ROM.

The controller 50 stores on the HDD 30 the MPEG data output from the MPEG encoding part 20, or, transfers the data to the digital signal processor 80 so as to read the video and audio data stored on the HDD 30. When reproducing the DVD, the controller 50 reads information on the DVD title from information of a disc information file area and stores the read information in a route directory area of the HDD 30. The controller 50 reads and displays the related GUI screen from the flash ROM 40 so as to display an icon and a title corresponding to the video data stored as the file format on the HDD 30 by executing the applications contained in the flash ROM 40. If the user wants to set the timer-recording with respect to a particular broadcast program, the controller 50 displays the timer-recording menu stored on the flash ROM 40, records the particular broadcast program on the HDD 30 when the timer-recording start time arrives, and performs the PIP function depending on the PIP mode input from the signal receiver 70.

When the controller 50 edits the file stored on the HDD 30, the RAM 60 loads the file to be edited. Specifically, the file stored on the HDD 30 is not directly editable, instead, the file is editable in the RAM 60 and the edited file is re-stored on the HDD 30.

The signal receiver 70 receives and transfers to the controller 50 a control signal (not shown), which is generated from a remote controller (not shown) or a manipulation key (not shown) provided on the conventional recording and reproducing apparatus. The remote controller or the manipulation key controls the video recording and reproducing apparatus, for example, to select a desired channel, to change volume, to adjust image quality, and to select the PIP mode.

The digital signal processor 80 receives the MPEG video data stored on the HDD 30 via the controller 50, and decodes and converts the received video data to a video format such as National Television Standards Committee (NTSC) or Phase Alteration Line (PAL). The converted signal is to be displayed on a display such as a television.

The DVD player 90 reads the video and audio data from the DVD and transfers the read data to the controller 50. The video and audio data transferred to the controller 50 is stored on the HDD 30 or is fed to the digital signal processor 80 of the display.

With the conventional video recording and reproducing apparatus constructed as above, the user may perform the timer-recording. Referring to FIG. 2, the controller 50 displays the data stored in the flash ROM 40 and the additional information input by the user for the timer-recording such as a record time and a channel to be recorded on the screen using the menu in the GUI form. The information relating to the timer-recording generally includes a broadcast channel to be recorded, a record date, a record start time, and a record stop time. Such timer-recording information is stored in the flash ROM 40. When the record start time arrives, the switch 10 receives the set broadcast channel, the MPEG encoding part 20 performs the signal processing, and the processed data is recorded on the HDD 30. While the timer-recording information is directly input on the screen, data such as a program guide may be employed to automatically receive and store the timer-recording information.

However, the timer-recording function of the above conventional video recording and reproducing apparatus, which receives the timer-recording information from the user or automatically receives and stores the timer-recording information, cannot execute the timer-recording operation unless the timer-recording information is provided. Further, a one touch recorder (OTR) operation, which records a current channel being viewed by the user, cannot be executed when the user views any other program on a different channel and the record start time passes by.

Accordingly, providing a new operation to automatically inquire of the user whether to record a program which is periodically recorded with a certain pattern at a record start time even when the program is not pre-set by the user for the timer-recording is necessary.

SUMMARY OF THE INVENTION

To overcome the above and/or other drawbacks and disadvantages of the conventional arrangements, an exemplary aspect of the present invention is to provide a video recording and reproducing apparatus capable of storing a recording pattern of a user for a recording without having to separately set a timer-recording and a method thereof.

An exemplary aspect of the present invention provides a video recording and reproducing apparatus receiving a broadcast signal from an outside and recording the received broadcast signal on a recording medium or outputting and displaying a playback signal of the apparatus onto a display. The video recording and reproducing apparatus comprises a memory storing a recording pattern table which organizes a record information comprising a record date and a record start time for a program and a recording pattern containing an accumulated number of a record repetition, and the memory storing a guide message for guiding the recording pattern, and a controller comparing a current time with the record start time of the recording pattern table stored in the memory and displaying the guide message onto the display if the current time and the record start time corresponds to each other.

The controller selects a program of which the accumulated number of the record repetition of the recording pattern table stored in the memory is more than a certain number, and compares the record start time of the recording pattern table stored in the memory with the current time. The controller displays the guide message onto the display if the current date and the record date correspond to each other. The controller compares a record information on a recording with the record information stored in the recording pattern table when a timer-recording or a recording starts, and increases the accumulated time of the record repetition by one if similar information is stored.

The memory is constructed to store a guide message for facilely selecting the recording, and the controller controls the video recording and reproducing apparatus to record a set channel when the recording is selected.

The recording pattern table comprises a recording pattern number field, a record date field, a record start field, a record broadcast channel field, and a record repetition count field so as to organize all necessary information for the recording.

If the video recording and reproducing apparatus is provided with a picture-in-picture (PIP) device, the controller outputs the guide message onto the PIP screen and, simultaneously, receives a channel recorded in the record broadcast channel field of the recording pattern table and displays the received channel onto the PIP screen.

Consistent with another exemplary aspect of the present invention, there is provided a video recording method of a video recording and reproducing apparatus receiving a broadcast signal from an outside and recording the received broadcast signal on a recording medium or outputting and displaying a playback signal of the apparatus onto a display. The video recording method comprises starting a recording or setting a timer-recording, storing in a recording pattern table a record information relating to the recording and an accumulated number of a record repetition, comparing a record start time stored in the recording pattern table with a current time, and displaying a guide message for notifying of correspondence of the recording pattern when the record start time and the current time correspond to each other.

To obtain more accurate recording pattern, the comparing selects a program of which the accumulated number of the record repetition count of the recording pattern table is more than a certain number, and compares the record start time of the recording pattern table stored in the memory with the current time.

The guide message comprises a selection window for selection of the recording, and the video recording and reproducing apparatus is controlled to record a set channel when the recording is selected. The recording pattern table comprises a recording pattern number field, a record date field, a record start field, a record broadcast channel field, and a record repetition count field. A record information on a recording is compared with the record information stored in the recording pattern table when a timer-recording or a recording starts, and the accumulated time of the record repetition is increased by one if similar information is stored.

A video recording method of a video recording and reproducing apparatus receiving a broadcast signal from an outside and recording the received broadcast signal on a recording medium or outputting a playback signal of the apparatus through a picture-in-picture (PIP) screen on a display, comprises starting a recording or setting a timer-recording, storing in a recording pattern table a record information relating to the recording and an accumulated number of a record repetition, comparing a record start time stored in the recording pattern table with a current time, and displaying a guide message onto the PIP screen a guide message for notifying correspondence of the recording pattern when the record start time and the current time correspond to each other.

The video recording method further comprises comparing a record information on a recording with the record information stored in the recording pattern table when a timer-recording or a recording starts, and increasing the accumulated time of the record repetition by one if similar information is stored.

The recording pattern table is configured to comprise a recording pattern number field, a record date field, a record start field, a record broadcast channel field, and a record repetition count field. The guide message is displayed onto the PIP screen and, simultaneously, a channel in the record broadcast channel field of the recording pattern table is received and displayed onto the PIP screen.

Accordingly, since the recording pattern of the user is stored, the user is informed of the recording of his or her favorite programs without having to set separately the timer-recording in advance.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawing figures of which.

DETAILED DESCRIPTION OF THE PREFERRED EMBODIMENTS

Figure 1:
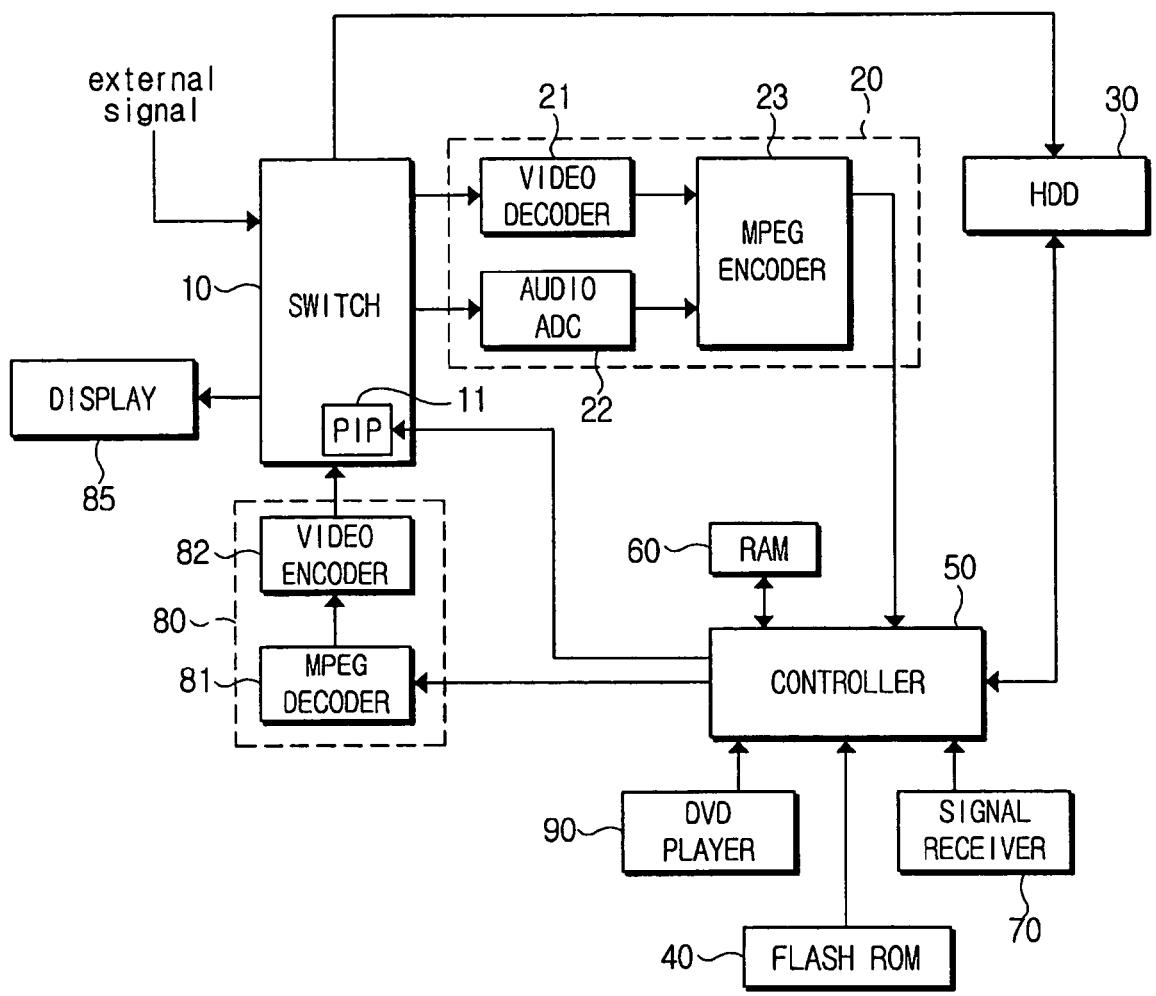
FIG. 1 is a block diagram illustrating a conventional digital television.
Figure 2:
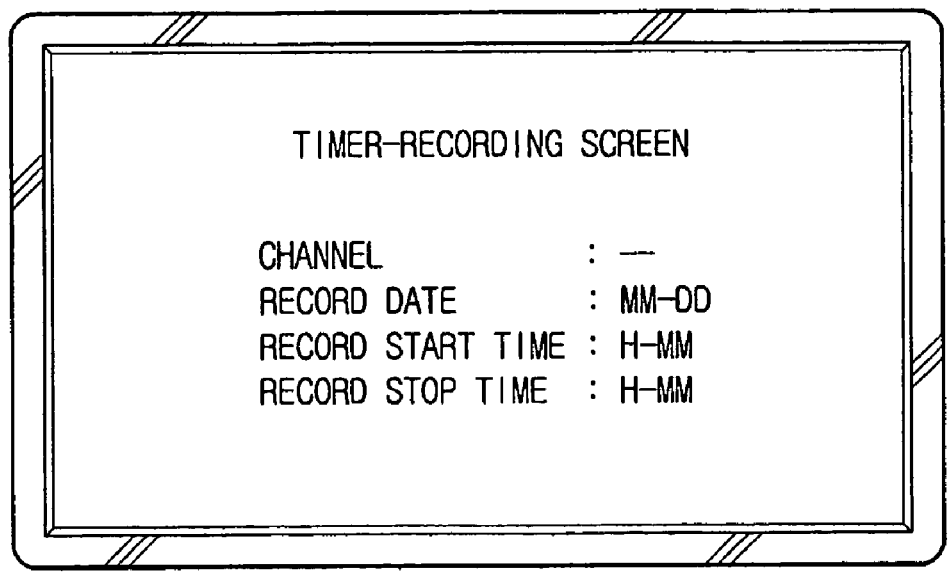
FIG. 2 is a view illustrating a timer-recording screen of the conventional digital television.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
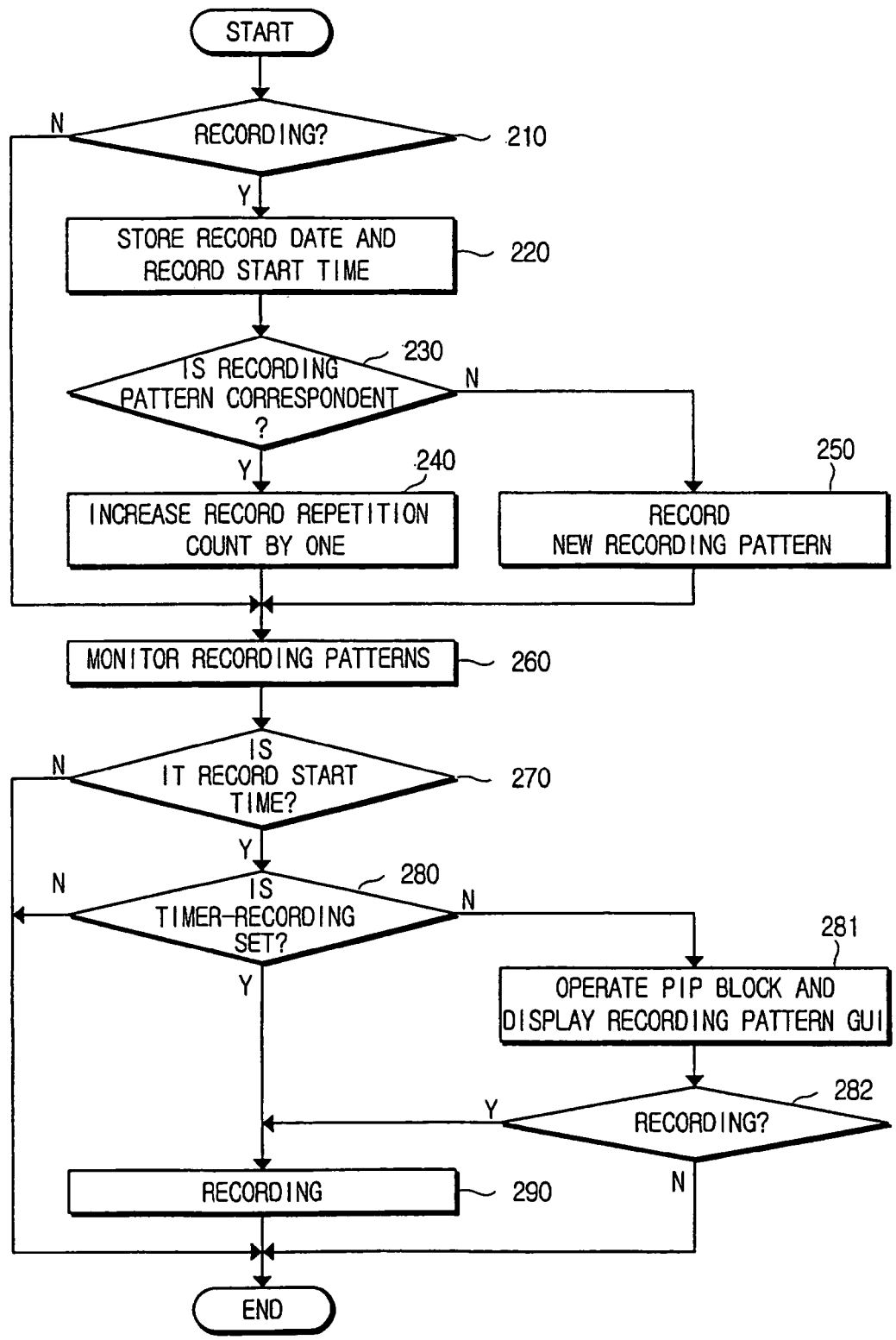
FIG. 3 is a flowchart illustrating exemplary recording operations in accordance with a recording pattern according to an exemplary embodiment of the present invention.
Figures 4, 5:
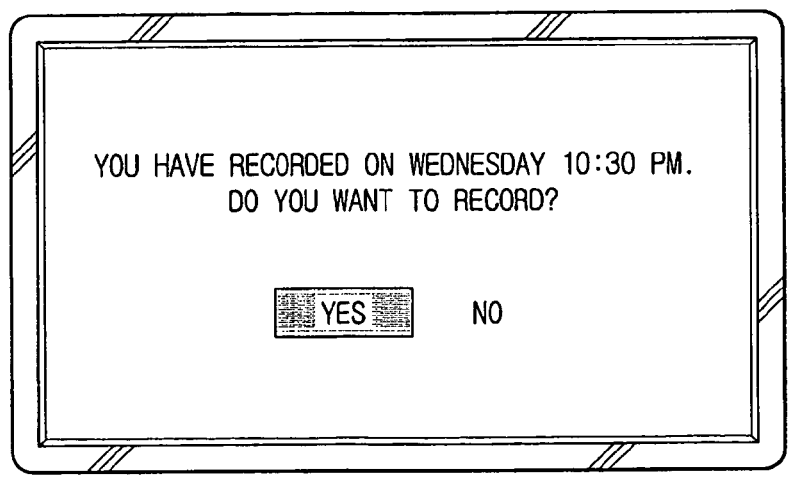
FIG. 4 is a view illustrating a recording pattern table.
FIG. 5 is a view illustrating an example of a recording guide message.

FIG. 3 illustrates a flowchart of recording operations in accordance with a recording pattern according to an exemplary embodiment of the present invention, FIG. 4 illustrates a recording pattern table, and FIG. 5 illustrates an example of a recording guide message.

The controller 50 is operable to store a recording pattern of a user or an operator at every recording time, as well as operable to perform general operations. At every recording time, the controller 50 creates a recording pattern table 100, as shown in FIG. 4, and organizes and stores information in the flash ROM 40. The recording pattern table 100 includes a recording pattern number field 110, a record date field 120, a record start time field 130, a record broadcast channel field 140, and a record repetition count field 150. The information organized in recording pattern table 100 is stored in the flash ROM 40. A recording pattern number of the recording pattern number field 110 is determined depending on a value of the record repetition count field 150. As an example, the recording pattern number is enumerated in an ascending order in accordance with a descending order of the record repetition count field 150. According to an exemplary embodiment of the present invention, the recording pattern table 100 arranges 12 recording patterns. However, the arrangement of the recording pattern table 100 is not limited to this embodiment and is adjustable as needed. While predetermined numbers of the recoding pattern are all enumerated, if a new recording pattern is to be registered, the recording pattern having the lowest ascending order is deleted and the new recording pattern is registered instead. When the recording pattern table 100 is stored in the flash ROM 40 and the date in the record date field 120 of the recorded pattern table 100 arrives, the controller 50 checks a current time. When a record start time of the related recording pattern is nearly at hand, the controller 50 controls a picture-in-picture (PIP) block 11. The causes the PIP block 11 to receive a related channel onto a PIP screen of a display 85. Simultaneously, the controller 50 displays a recording guide message onto the PIP screen to notify of the record start time of a favorite program that is frequently recorded by the user. Accordingly, the user may decide to record after perceiving the recoding guide message on the PIP screen even when the user forgets to set the timer-recording with respect to the favored program.

The recording pattern table 100 is described in more detail below with reference to FIG. 4. The recording pattern table 100 includes the recording pattern number field 110, the record date field 120, the record start time field 130, the record broadcast channel field 140, and the record repetition count field 150. The record repetition count field 150 presents an accumulated number of the repetitive recording times. When the user presses a key, such as, a one touch recorder (OTR) key or a record (REC) key, to set the general recording or the timer-recording, the controller 50 looks up a corresponding recording pattern and increases the value of the record repetition count field 150. The recording pattern table 100 organizes and stores the recording pattern in the descending order based on the record repetition count.

As an example, if one assumes that the user recorded a first program on channel 12 at 10:30 pm on a total of four different Wednesdays, a second program on channel 24 at 9:00 pm on eleven different Thursdays, and a third program on channel 12 at 9:00 pm on twelve different Fridays, the third program is stored first as number 1 in the recording pattern number field 110, the second program is stored as number 2, and the first program is stored as number 3 in the ascending order based on the record repetition count, as shown in FIG. 4. It should be appreciated that this field configuration is not limited to this embodiment and that additional fields may be registered. As an example of this, information may include a record stop time and other information relating to the recording process.

Referring now to FIG. 3, a recording method by storing the recording pattern of the user according to an exemplary embodiment of the present invention is described below.

When the user starts the recording or sets the timer-recording at operation 210, the controller 40 stores the record date, the record start time, and the record broadcast channel with respected to the recording at operation 220. The controller 40 determines whether there is a corresponding recording pattern by reading the recording pattern table 100 in the flash ROM 50 at operation 230. If so, the controller 40 increases the value of the recording in the record repetition count field 150 by one at operation 240. If not, the controller 40 records a new recording pattern to the recording pattern number column 100 and stores the related information at operation 250. Specifically, if the predetermined number of the recording pattern number is enumerated and a new recording pattern is to be registered, the lowest recording pattern in the ascending order is deleted and, instead, the new recording pattern is registered. If the user does not start the recording or set the timer-recording at operation 210, or, after the operations 240 and 250, the controller 40 monitors the recording patterns stored in the recording pattern table 100 at operation 260, and determines whether the record start time on that day is at hand at operation 270. If so, the controller 40 determines whether the timer-recording is set for the corresponding recording pattern at operation 280. If so, the recording is performed at operation 290. If not, the controller 40 operates the PIP block 11 and displays on the PIP screen of the display 85 the recording guide message (FIG. 5) output from the flash ROM 50, notifying of the record start time of a favorite program frequently recorded by the user in the past at operation 281. In an embodiment of the invention, the recording guide message includes a cursor so that the user moves the cursor to select or cancel the recording. If the user selects the recording at operation 282, the controller 40 performs the recording with respect to the corresponding recording pattern at operation 290. If the user does not select the recording, the controller 40 terminates the recording operation.

In the light of foregoing described above, when the record start time of the recording pattern stored in the recording pattern table 100 is at hand, the recording guide message is displayed. However, the recording guide message may be displayed only when the record repetition count is more than a certain number of times.

According to an exemplary embodiment of the present invention, the timer-recording needs not to be set separately by the user since the recording pattern of the user is stored.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A video recording and reproducing apparatus to receive a broadcast signal and to record the received broadcast signal on a recording medium or to output and display a playback signal of the apparatus onto a display, the apparatus comprising:

a memory to store a recording pattern table which organizes record information including a record day of the week, the record day of the week being the same in a plurality of previous recording operations selected by a user to thereby establish a recording pattern, a record start time of a program, the record start time being the same in the plurality of previous recording operations, and an accumulated number of repetitions in which the same record day of the week and record start time are selected, the memory further storing a guide message to guide the recording pattern; and a controller to compare a current time with the record start time of the recording pattern table stored in the memory and to display the guide message on the display if the current time and the record start time correspond to each other.

2. The video recording and reproducing apparatus of claim 1, wherein the controller compares a current day of the week with the record day of the week stored in the memory and displays the guide message onto the display if the current day of the week and the record day of the week correspond to each other.

3. The video recording and reproducing apparatus of claim 1, wherein the controller selects a program of which the accumulated number of the repetitions of the recording pattern table stored in the memory is more than a certain number, and compares the record start time of the recording pattern table stored in the memory with the current time.

4. The video recording and reproducing apparatus of claim 1, wherein the memory stores a guide message to select the recording, and the controller controls the video recording and reproducing apparatus to record a set channel when the recording is selected.

5. The video recording and reproducing apparatus of claim 1, wherein the controller compares record information on a recording with the record information stored in the recording pattern table when a timer-recording or a recording starts, and increases the accumulated number of repetitions by one if similar information is stored.

6. The video recording and reproducing apparatus of claim 1, wherein the recording pattern table comprises a recording pattern number field, a record day of the week field, a record start field, a record broadcast channel field, and a record repetition count field.

7. The video recording and reproducing apparatus of claim 6, wherein the recording pattern number field organizes a recording pattern in an ascending order in accordance with a descending order of the record repetition count field.

8. The video recording and reproducing apparatus of claim 1, further comprising a picture-in-picture (PIP) device, wherein the controller displays the guide message onto the PIP screen.

9. The video recording and reproducing apparatus of claim 8, wherein the controller outputs the guide message onto the PIP screen and, simultaneously, receives a channel recorded in the record broadcast channel field of the recording pattern table and displays the received channel onto the PIP screen.

10. A video recording method of a video recording and reproducing apparatus that receives a broadcast signal and records the received broadcast signal on a recording medium or outputs and displays a playback signal of the apparatus onto a display, the method comprising:

starting a recording or setting a timer-recording;

storing record information relating to the recording and an accumulated number of record repetitions in a recording pattern table, the record information including a record start time being the same in a plurality of previous recording operations selected by a user to thereby establish a recording pattern;

comparing the record start time that is stored in the recording pattern table with a current time; and displaying a guide message to notify of correspondence of the recording pattern when the record start time and the current time correspond to each other.

11. The video recording method of claim 10, wherein the displaying comprises displaying the guide message to notify the correspondence of the recording pattern when the record start time and the current time correspond in the comparing and a current day of the week corresponds to a record day of the week being the same in the plurality of previous recording operations that is stored in the recording pattern table.

12. The video recording method of claim 10, wherein the comparing comprises:
 selecting a program of which the accumulated number of the record repetition count of the recording pattern table is more than a certain number; and
 comparing the record start time of the recording pattern table that is stored in the memory with the current time.

13. The video recording method of claim 10, wherein the guide message comprises a selection window to select the recording, and the video recording and reproducing apparatus is controlled to record a set channel when the recording is selected.

14. The video recording method of claim 10, further comprising:
 comparing a record information on a recording with the record information stored in the recording pattern table when a timer-recording or a recording starts; and
 increasing the accumulated time of the record repetition by one if similar information is stored.

15. The video recording method of claim 10, wherein the recording pattern table comprises a recording pattern number field, a record day of the week field, a record start field, a record broadcast channel field, and a record repetition count field.

16. The video recording method of claim 15, wherein the recording pattern number field organizes a recording pattern in an ascending order in accordance with a descending order of the record repetition count field.

17. A video recording method to be used with a video recording and reproducing apparatus to receive a broadcast signal from an outside and to record the received broadcast signal on a recording medium or to output a playback signal of the apparatus through a picture-in-picture (PIP) screen on a display, the method comprising:
 starting a recording or setting a timer-recording;
 storing record information relating to the recording and an accumulated number of a record repetitions in a recording pattern table, the record information including a record start time being the same in a plurality of previous recording operations selected by a user to thereby establish a recording pattern;
 comparing the record start time stored in the recording pattern table with a current time; and
 displaying a guide message to notify correspondence of the recording pattern when the record start time and the current time correspond to each other in the comparing onto the PIP screen.

18. The video recording method of claim 17, wherein the displaying displays the guide message to notify the correspondence of the recording pattern when the record start time and the current time correspond in the comparing and a current day of the week corresponds to a day of the week being the same in the plurality of previous recording operations that is stored in the recording pattern table.

19. The video recording method of claim 17, wherein the comparing selects a program of which the accumulated number of the record repetition of the recording pattern table is more than a certain number and compares the record start time of the recording pattern table stored in the memory with the current time.

20. The video recording method of claim 17, wherein the guide message comprises a selection window to select the recording, and the video recording and reproducing apparatus is controlled to record a set channel when the recording is selected.

21. The video recording method of claim 17, further comprising:
 comparing a record information on a recording with the record information stored in the recording pattern table when a timer-recording or a recording starts; and
 increasing the accumulated time of the record repetition by one if similar information is stored.

22. The video recording method of claim 17, wherein the recording pattern table comprises a recording pattern number field, a record day of the week field, a record start field, a record broadcast channel field, and a record repetition count field.

23. The video recording method of claim 22, wherein the recording pattern number field organizes a recording pattern in an ascending order in accordance with a descending order of the record repetition count field.

24. The video recording method of claim 22, wherein the guide message is displayed onto the PIP screen and, simultaneously, a channel in the record broadcast channel field of the recording pattern table is received and displayed onto the PIP screen.

* * * * *